(12) United States Patent
Satoi et al.

(10) Patent No.: US 12,246,771 B2
(45) Date of Patent: *Mar. 11, 2025

(54) VEHICLE REAR COMPONENT

(71) Applicant: TOYOTA JIDOSHA KABUSHIKI KAISHA, Toyota (JP)

(72) Inventors: Taisuke Satoi, Okazaki (JP); Yuta Egawa, Okazaki (JP); Koh Hirokawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/490,156

(22) Filed: Oct. 19, 2023

(65) Prior Publication Data

US 2024/0208572 A1   Jun. 27, 2024

(30) Foreign Application Priority Data

Dec. 26, 2022   (JP) .................................. 2022-207978

(51) Int. Cl.
| | |
|---|---|
| *B62D 21/11* | (2006.01) |
| *B60K 17/04* | (2006.01) |
| *B62D 25/02* | (2006.01) |
| *B62D 25/04* | (2006.01) |

(52) U.S. Cl.
CPC ............. *B62D 21/11* (2013.01); *B60K 17/04* (2013.01); *B62D 25/04* (2013.01); *B62D 25/025* (2013.01)

(58) Field of Classification Search
CPC .... B62D 25/04; B62D 25/025; B62D 25/088; B62D 21/11; B62D 21/03; B62D 23/00; B62D 25/08; B62D 21/20

USPC .......................... 280/124.109, 781; 180/312
See application file for complete search history.

(56) References Cited

U.S. PATENT DOCUMENTS

| | | | | |
|---|---|---|---|---|
| 6,193,273 B1* | 2/2001 | Novak | ................... | B62D 21/00 |
| | | | | 280/781 |
| 2023/0391403 A1* | 12/2023 | Liu | ......................... | B62D 21/02 |
| 2024/0208573 A1* | 6/2024 | Satoi | ....................... | B62D 25/08 |
| 2024/0208576 A1* | 6/2024 | Egawa | ................... | B62D 21/11 |
| 2024/0208579 A1* | 6/2024 | Hata | .................. | B62D 25/2027 |

(Continued)

FOREIGN PATENT DOCUMENTS

| | | |
|---|---|---|
| JP | H06-286652 A | 10/1994 |
| JP | 2016-141166 A | 8/2016 |

OTHER PUBLICATIONS

"Audi INVE_MEM_2009_114346_Audi R8 Intensive Use of Aluminium in Car Body Construction", Jun. 2009, https://www.researchgate.net/figure/Aluminium-Space-Frame-ASFR-Audi-R8-that-is-constructed-of-aluminium-alloy-extrusions_fig1_301223077, 18pp.

(Continued)

*Primary Examiner* — Paul N Dickson
*Assistant Examiner* — Tiffany L Webb
(74) *Attorney, Agent, or Firm* — SoraIP, Inc.

(57) ABSTRACT

The rear component is an integrally cast hollow member, and is composed of a main body, a tower, and a suspension member. Arm brackets to which the arms of the suspension device are connected are attached to the outer surfaces of the main body and the suspension in the vehicle width direction. The body portion includes a first connecting member that connects the right side plate and the left side plate in the vehicle width direction at a position where the arm bracket is provided.

4 Claims, 6 Drawing Sheets

(56) References Cited

U.S. PATENT DOCUMENTS

| | | | |
|---|---|---|---|
| 2024/0208584 A1* | 6/2024 | Satoi | B62D 25/088 |
| 2024/0208585 A1* | 6/2024 | Satoi | B62D 25/04 |
| 2024/0208587 A1* | 6/2024 | Satoi | B62D 25/2036 |

OTHER PUBLICATIONS

"Mercedes—AMG GT AMG Development No. 2 GT car with space frame structure", Jun. 24, 2019, https://car.motor-fan.jp/tech/10010224. 8pp.

"The 296 GT3, designed only to win, marks a new page in Ferrari's racing history! Non-hybrid V6 3 turbo, 600 hp", Jul. 30, 2022, https://intensive911.com/italian-car-brand/ferrari/260154/, 8pp.

* cited by examiner

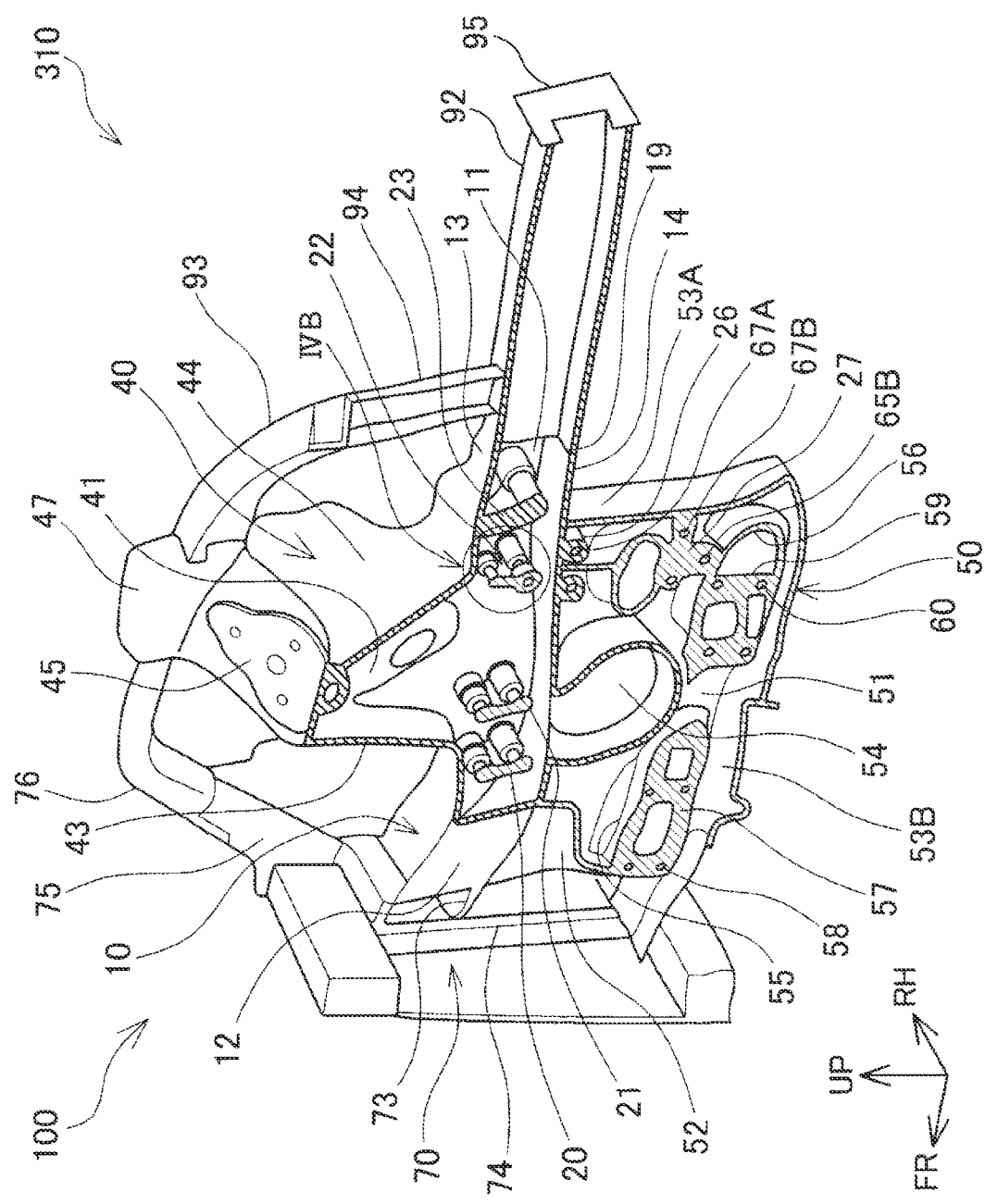
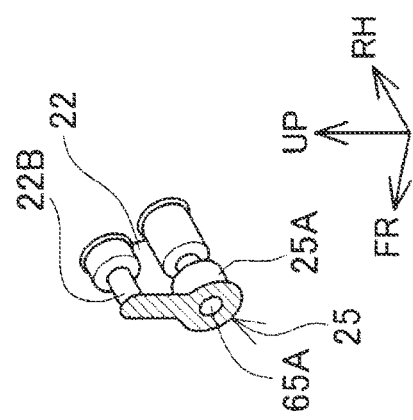
FIG. 4A
FIG. 4B

VEHICLE REAR COMPONENT

CROSS-REFERENCE TO RELATED APPLICATION

This application claims priority to Japanese Patent Application No. 2022-207978 filed on Dec. 26, 2022, incorporated herein by reference in its entirety.

BACKGROUND

1. Technical Field

The present disclosure relates to the structure of a vehicle rear component. More specifically, the present disclosure relates to the structure of a vehicle rear component to which a suspension arm is attached.

2. Description of Related Art

Japanese Unexamined Patent Application Publication No. 2016-141166 (JP 2016-141166 A) discloses a structure in which a bracket for attaching a suspension arm is connected to a front side member at the front of a vehicle by welding.

SUMMARY

In recent years, there has been a demand for weight reduction and rigidity improvement of vehicles. In this regard, the structure described in JP 2016-141166 A has room for improvement.

In view of this, an object of the present disclosure is to reduce the weight of a vehicle and to improve the strength and rigidity of the vehicle.

A vehicle rear component of the present disclosure is a vehicle rear component to be connected to a rear end of a rocker and a rear pillar and to extend rearward of a vehicle.

The vehicle rear component is an integrally cast hollow member including a body, a tower, and a suspension member.

The body has a closed section at least in part, extends in a vehicle front-rear direction, and connects the rear pillar and a rear member at a rear of the vehicle.

The tower is connected to an upper side of the body and has a space for housing a part of a suspension device.

The suspension member has a closed section at least in part, extends in the vehicle front-rear direction on a lower side of the body, and includes a front end connected to the rocker and the rear pillar.

Arm brackets for connecting arms of the suspension device are provided on vehicle width direction outer surfaces of the body and the suspension member.

The body includes a first connecting member that connects a vehicle width direction outer plate and a vehicle width direction inner plate in a vehicle width direction at a position where the arm bracket is provided.

Accordingly, the vehicle rear component of the present disclosure can reduce the weight of the vehicle and improve the strength and rigidity of the portion where the body and the arm of the suspension device are connected.

In the vehicle rear component of the present disclosure, the first connecting member may be cast integrally with the body, the tower, and the suspension member.

Accordingly, the vehicle rear component of the present disclosure can have a simple structure.

In the vehicle rear component of the present disclosure, transaxle mount brackets for connecting a transaxle may be provided on vehicle width direction inner surfaces of the body and the suspension member, and the body and the suspension member may include second connecting members that connect the vehicle width direction outer plate and the vehicle width direction inner plate in the vehicle width direction at positions where the transaxle mount brackets are provided.

Accordingly, the vehicle rear component of the present disclosure can reduce the weight of the vehicle and improve the strength and rigidity of the portion where the body and the transaxle are connected and the portion where the suspension member and the transaxle are connected.

In the vehicle rear component of the present disclosure, the second connecting members may be cast integrally with the body, the tower, and the suspension member.

Accordingly, the vehicle rear component of the present disclosure can have a simple structure.

According to the present disclosure, it is possible to reduce the weight of the vehicle and to improve the strength and rigidity of the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4A is a cross-sectional perspective view of the rear component showing the IVA-IVA section shown in FIG. 3;

FIG. 4B is a perspective view showing details of the IVB section shown in FIG. 4A;

DETAILED DESCRIPTION OF EMBODIMENTS

Hereinafter, a vehicle rear component 100 (hereinafter referred to as a rear component 100) of an embodiment will be described with reference to the drawings. A rear structure 310 of a vehicle 300 comprising a rear component 100 is first described with reference to FIG. 1. In the following description, the rear structure 310 on the right side of the vehicle 300 will be described. Since the rear structure 310 on the left side of the vehicle 300 is bilaterally symmetrical with the rear structure 310 on the right side, the description thereof is omitted. An arrow FR shown in each drawing indicates the front side of the vehicle 300. An arrow UP shown in each figure indicates the upper side of the vehicle 300. An arrow RH shown in each figure indicates the right side of the vehicle 300. Also, the opposite direction of arrow FR indicates the rear side. The opposite direction of arrow UP indicates downward. The opposite direction of arrow RH points to the left. Hereinafter, when simply using the front-rear, left-right, and up-down directions, the front-rear direction, the left-right direction, and the up-down direction of the vehicle 300 are indicated unless otherwise specified.

Figure 1:
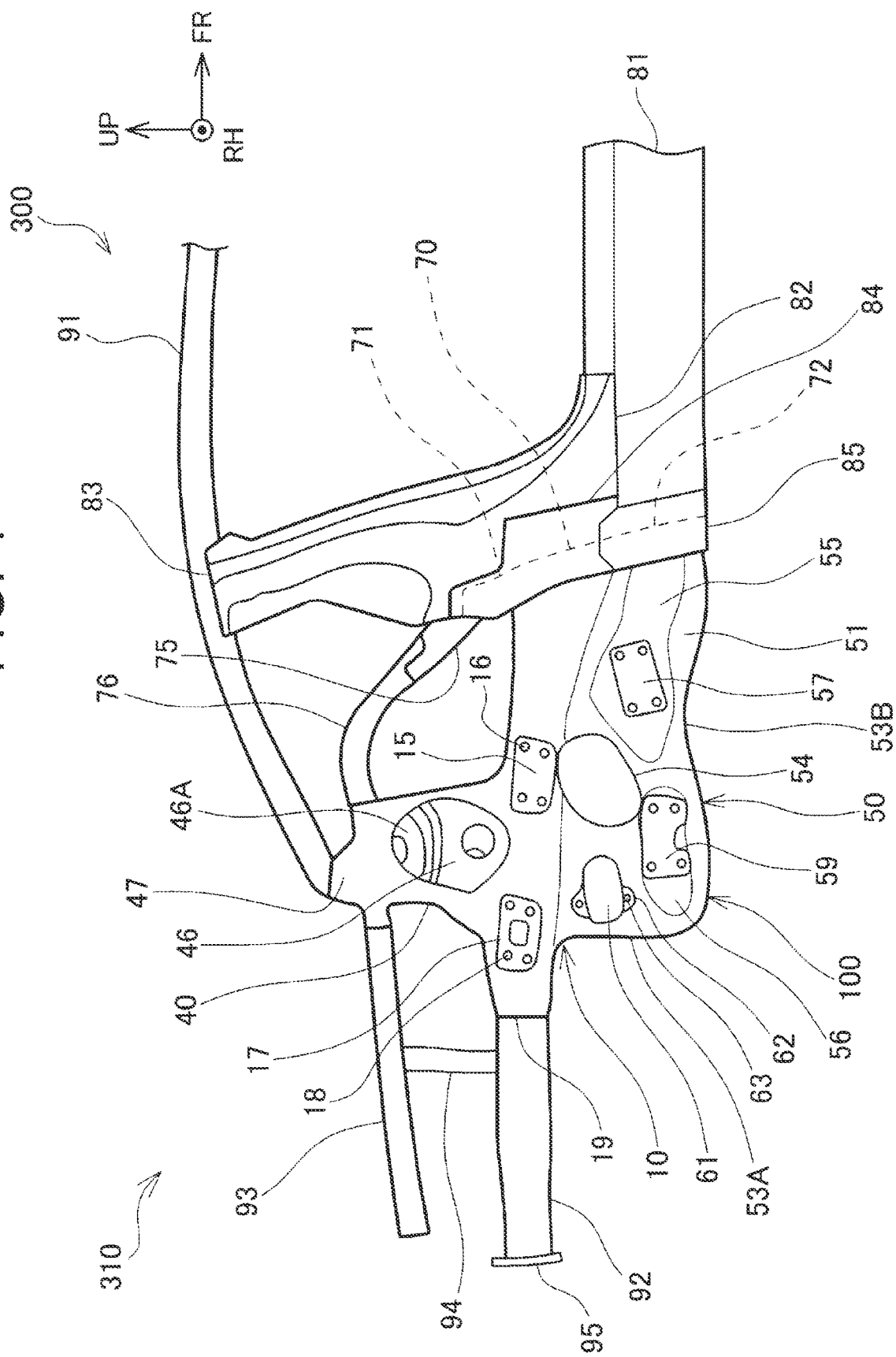
FIG. 1 is a side view showing the rear structure of a vehicle provided with the rear component of the embodiment.

As shown in FIG. 1, a rear structure 310 of a vehicle 300 includes rockers 81, rear pillars 84, rear pillar outers 82, rear components 100, rear members 92, cross-connection members 93, struts 94, and connection members 76 and roof rails 91.

Figure 2:
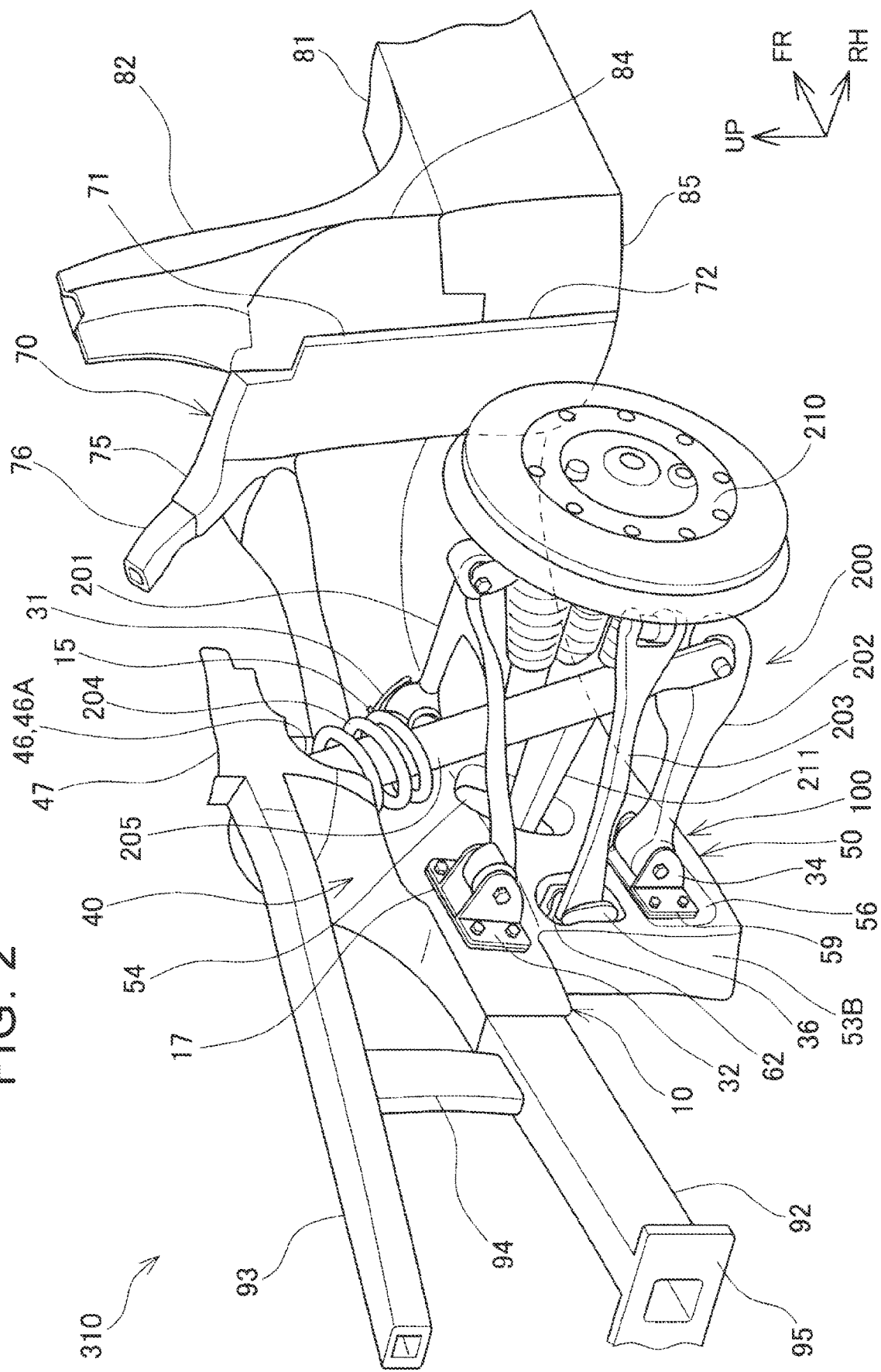
FIG. 2 is a perspective view showing a state in which a suspension device is attached to a rear component of the embodiment.

Rocker 81 is a structural member that extends in the front-rear direction at the side end of vehicle 300. The rocker 81 has a square closed cross-sectional shape. A rear pillar 84 is attached to the upper surface of the rear end portion of the rocker 81. A rear pillar outer 82 is connected to the top and front of the rear pillar 84. Also, the lower end of the rear pillar outer 82 is connected to the upper surface of the rear end portion of the rocker 81. A rear end plate 85 is attached to the rear end of the rocker 81. Thus, the rear pillar 84 and the rear pillar outer 82 are attached to the rear end portion of the rocker 81. As shown in FIG. 2, the rear pillar outer 82 is a hat-shaped closed cross-section structural member that extends upward from the rocker 81.

As shown in FIGS. 1 and 2, the rear component 100 is a structural member connected to the rear end of the rocker 81 and the rear pillar 84 and extending rearward of the vehicle. The rear component 100 is an integrally cast hollow member and is composed of a body portion 10, a tower portion 40, a suspension member 50 and a front end block 70. Details of the construction of the rear component 100 will be described later with reference to FIGS. 3 to 6.

The rear member 92 is a structural member with a closed cross section that is connected to the rear end 19 of the rear component 100 and extends rearward of the vehicle. A rear end plate 95 is attached to the rear end of the rear member 92.

The cross-connection member 93 is a cross member that connects the rear ends of the upper pedestals 47 of the tower portions 40 of the left and right rear components 100 to the left and right. The strut 94 is a closed-section member that connects the upper surface of the rear member 92 and the lower surface of the cross-connection member 93. The connection member 76 is a member with a closed cross section that connects the front end of the upper pedestal 47 of the tower portion 40 and the upper portion of the front end block 70.

Roof rail 91 is a structural member forming the roof of vehicle 300. The roof rail 91 is a longitudinal member with a closed cross section that extends in the front-rear direction at the upper side end portion of the vehicle 300. A central portion of the roof rail 91 is connected to the upper end 83 of the rear pillar outer 82. The roof rail 91 extends obliquely rearward of the vehicle from the upper end 83 of the rear pillar outer 82 toward the upper pedestal 47 of the tower portion 40. A rear end of the roof rail 91 is connected to the upper pedestal 47 of the tower portion 40.

Referring now to FIG. 2, the suspension device 200 attached to the rear component 100 will be briefly described. The suspension device 200 comprises upper arm 201, two lower arms 202, middle arm 203, coil spring 204 and shock absorber 205. The upper arm 201 connects the arm brackets 31 and 32 fixed to the body portion 10 and the upper portion of the wheel 210. The rear lower arm 202 connects the arm bracket 34 fixed to the suspension member 50 and the rear lower portion of the wheel 210. A front lower arm 202 (not shown) connects an arm bracket 34 (not shown) fixed to the front of the suspension member 50 and the front lower portion of the wheel 210. The structure of the front arm bracket 34 (not shown) is the same as that of the rear arm bracket 34 shown. The middle arm 203 connects the arm bracket 36 fixed to the suspension member 50 and the center portion of the wheel 210 in the vertical direction. A shock absorber 205 is connected to the lower portion of the wheel 210. An upper portion of the shock absorber 205 is accommodated in the recess 46 of the tower portion 40. The upper end of shock absorber 205 is connected to the upper portion of tower portion 40. Like the shock absorber 205, the coil spring 204 is housed in the recess 46 of the tower portion 40 at its upper portion. A drive shaft 211 is connected to the wheel 210. The suspension member 50 is provided with an opening 54 through which the drive shaft 211 extends in the vehicle width direction.

Next, the structure of the rear component 100 will be described with reference to FIGS. 3 to 6. As described above, the rear component 100 is an integrally cast hollow member and is composed of the body portion 10, the tower portion 40, the suspension member 50 and the front end block 70.

Figure 3:
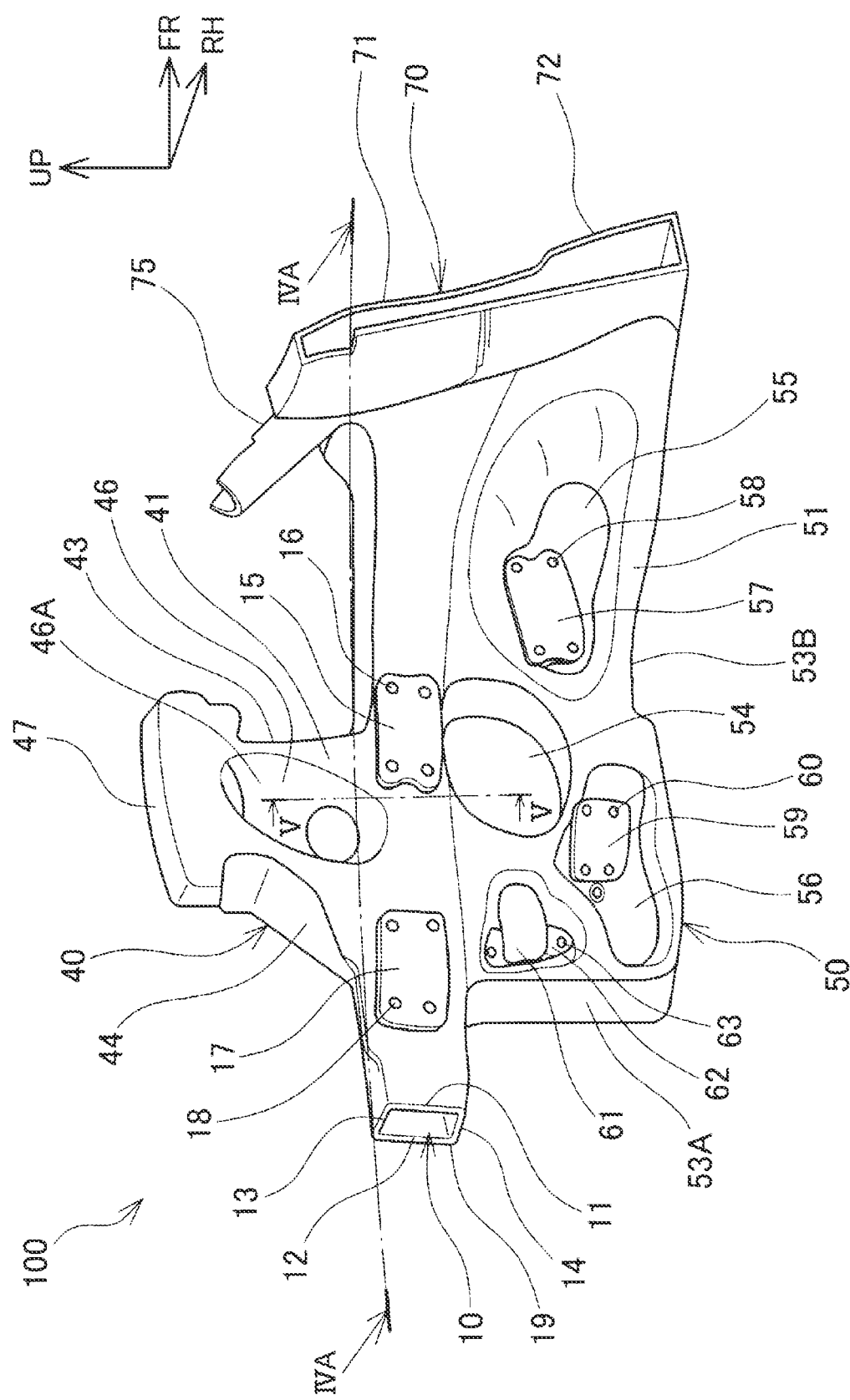
FIG. 3 is a perspective view showing a rear component of an embodiment.

The body portion 10 is a portion that has a closed cross-section at least partially and extends in the vehicle front-rear direction. The front end of the body portion 10 is connected to the upper half portion 71 of the front end block 70. As shown in FIG. 3, the general portion of the body portion 10 is a rectangular closed cross-sectional portion composed of an upper plate 13, a lower plate 14, a right side plate 11 and a left side plate 12. Here, the right side plate 11 constitutes a vehicle width direction outside plate of the body portion 10. Further, the left side plate 12 constitutes a vehicle width direction inner side plate of the body portion 10.

The closed cross-sectional shape of the general portion of the body portion 10 and the closed cross-sectional shape of the rear member 92 are the same shape. Therefore, when the rear member 92 is connected to the rear end 19 of the body portion 10, the body portion 10 and the rear member 92 form a rear side member, which is a structural member extending from the rear pillar 84 toward the rear of the vehicle.

As shown in FIGS. 4A and 4B, the upper plate 13 is cut out at the portion of the body portion 10 connected to the tower portion 40 (portion other than the general portion). The upper plate 13 is divided into a front portion positioned forward of the portion connected to the tower portion 40 and a rear portion positioned rearward of the portion connected to the tower portion 40. As shown in FIGS. 3, 4A, 4B and 6, the tower portion 40 is composed of a right side plate 41, a left side plate 42, a front plate 43, a rear plate 44 and a ceiling plate 45. A front portion of the upper plate 13 is connected to a front plate 43 of the tower portion 40. Also, the rear portion of the upper plate 13 is connected to the rear plate 44 of the tower portion 40. The front plate 43 and the rear plate 44 are connected to each other by a ceiling plate 45. Also, the right side plate 11 of the body portion 10 is connected to the right side plate 41 of the tower portion 40. The left side plate 12 of the body portion 10 is connected to the left side plate 42 of the tower portion 40. Therefore, the portions of the body portion 10 connected to the tower portion 40 are the front plate 43, the rear plate 44, the ceiling plate 45, the lower plate 14, the right side plates 11 and 41, and the left side plates 12 and 42. It has a closed cross-sectional shape that is constructed and extends in the vehicle front-rear direction.

Figure 6:
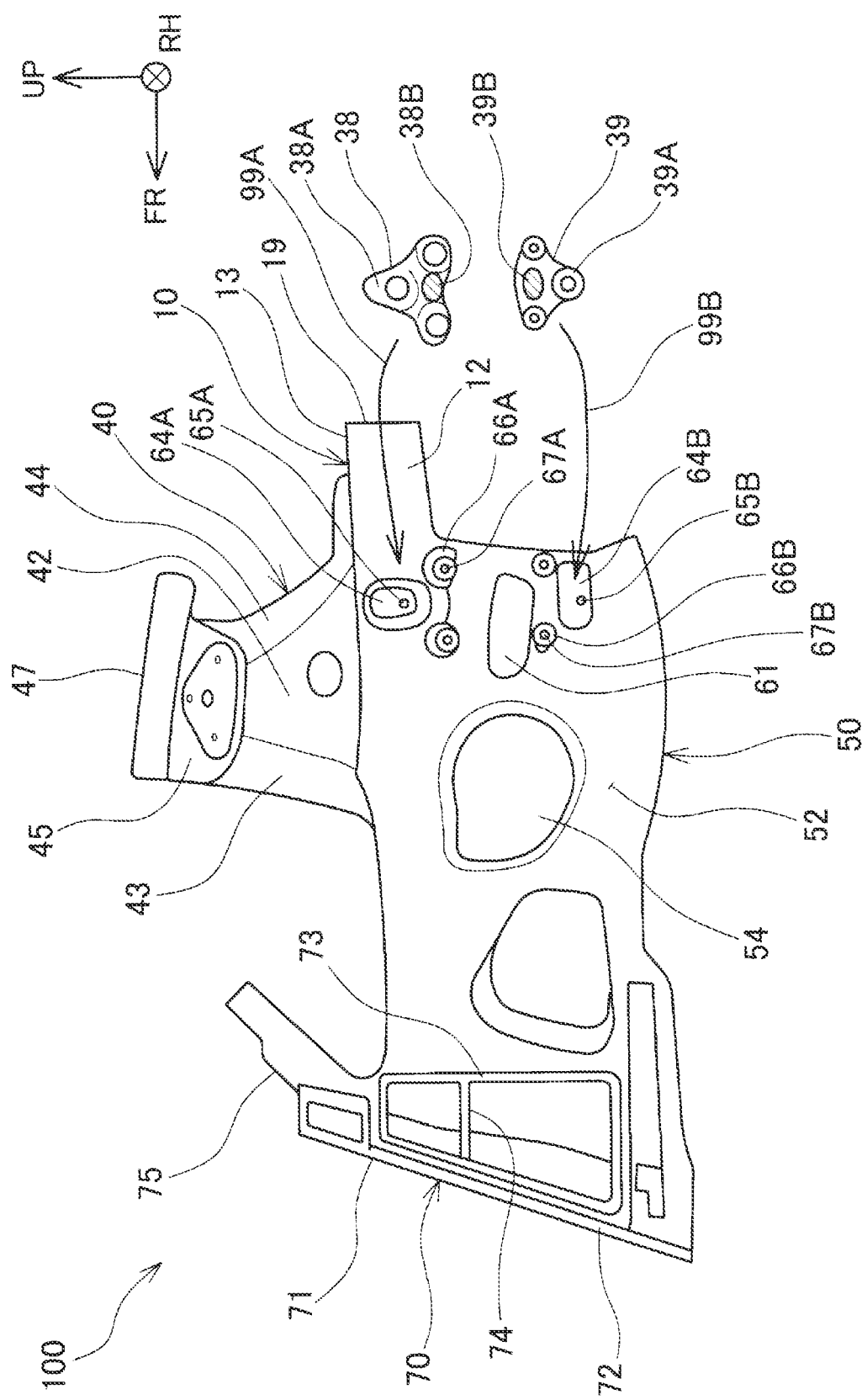
FIG. 6 is a side view showing the vehicle width direction inner side surface of the rear component of the embodiment.

As shown in FIG. 3, the surface of the right side plate 11 is provided with pedestals 15 and 17 to which the arm brackets 31 and 32 shown in FIG. 2 are fixed. Here, the surface of the right side plate 11 is the vehicle width direction outer surface of the body portion 10. Pedestals 15 and 17 are provided with bolt holes 16 and 18 for fixing arm brackets 31 and 32. Further, as shown in FIG. 6, the surface of the left side plate 12 is provided with a pedestal 64A to which the upper portion of the transaxle mount bracket 38 is fixed. Here, the transaxle mount bracket 38 is a bracket that connects the upper portion of a transaxle (not shown) and the body portion 10. The transaxle mount bracket 38 is composed of a base 38A fixed to the pedestal 64A and a transaxle support portion 38B erected from the base 38A. The pedestal 64A is provided with a bolt hole 65A for fixing the upper portion of the transaxle mount bracket 38. As indicated by arrow 99A in FIG. 6, the upper portion of transaxle mount bracket 38 is bolted to pedestal 64A. Here, the surface of the left side plate 12 is the vehicle width direction inner side surface of the body portion 10.

The tower portion 40 is a portion that is connected to the upper side of the body portion 10 and has a recess 46 that accommodates a portion of the suspension device 200. As described above, the tower portion 40 is composed of the right side plate 41, the left side plate 42, the front plate 43, the rear plate 44 and the ceiling plate 45. The front plate 43 and the rear plate 44 are connected to the upper plate 13 of the body portion 10 so as to rise from the upper plate 13. Also, the right side plate 41 is connected to the right side plate 11 of the body portion 10. Similarly, the left side plate 42 is connected to the left side plate 12 of the body portion 10. A recess 46 is provided in the right side plate 41. The recess 46 is a cylindrical recess that is recessed inward in the vehicle width direction and whose central axis is inclined obliquely outwardly of the vehicle. An upper portion of the recess 46 is connected to the ceiling plate 45. An upper portion of the coil spring 204 and an upper portion of the shock absorber 205 are accommodated in the space 46A inside the recess 46. An upper pedestal 47 is provided at the right end of the ceiling plate 45 of the tower portion 40. As described above, the roof rail 91, the connection member 76 and the cross-connection member 93 are connected to the upper pedestal 47.

At least a portion of the suspension member 50 has a closed cross section and extends in the vehicle front-rear direction on the lower side of the body portion 10. As shown in FIGS. 3, 4A, 4B and 6, the suspension member 50 includes a right side plate 51, a left side plate 52, a rear plate 53A and a lower plate 53B. The suspension member 50 includes a right side plate 51, a left side plate 52, a rear plate 53A, a front end block 70, a lower plate 53B, and a lower plate 14 of the body portion 10, and is divided into right, left, rear, and front sides, the lower side and the upper side are surrounded by a closed section hollow member. Here, the right side plate 51 constitutes a vehicle width direction outside plate of the suspension member 50. The left side plate 52 constitutes the vehicle width direction inner side plate of the suspension member 50.

A cylindrical opening 54 through which the drive shaft 211 passes is provided in the center of the suspension member 50. A mortar-shaped recess 55 is provided in front of the right side plate 51. The bottom of the recess 55 is flat. A pedestal 57 to which the front arm bracket 34 is fixed is provided on the bottom. The pedestal 57 is provided with bolt holes 58 for fixing the front arm bracket 34. A recess 56 recessed in a step shape from the surface of the right side plate 51 is provided on the rear lower side of the right side plate 51. A pedestal 59 to which the rear arm bracket 34 is fixed is provided at the bottom of the recess 56. The pedestal 59 is provided with bolt holes 60 for fixing the rear arm bracket 34. An oval opening 61 is provided on the rear upper side of the right side plate 51. The peripheral portion of the opening 61 and the surface of the right side plate 51 are connected by an inclined curved surface. Pedestals 62 to which the arm bracket 36 shown in FIG. 2 is fixed are provided in an upper portion and a lower portion of the opening 61. Each pedestal 62 is provided with a bolt hole 63 for fixing the arm bracket 36. Here, the bottom portion of the recess 55 and the bottom portion of the recess 56 are the outer surface of the suspension member 50 in the vehicle width direction.

As shown in FIG. 6, two pedestals 66A to which the lower portion of the transaxle mount bracket 38 is fixed are provided on the surface of the rear upper end portion of the left side plate 52. Each pedestal 66A is provided with a bolt hole 67A for fixing the lower portion of the transaxle mount bracket 38. Further, on the surface of the part slightly below the rear center of the left side plate 52, there are two pedestals 66B to which the upper part of the transaxle mount bracket 39 is fixed, and a pedestal 64B to which the lower part of the transaxle mount bracket 39 is fixed. The transaxle mount bracket 39 is composed of a base 39A fixed to the pedestals 64B and 66B and a transaxle support portion 39B erected from the base 39A.

Each pedestal 66B is provided with a bolt hole 67B for fixing the upper portion of the transaxle mount bracket 39. Further, the pedestal 64B is provided with a bolt hole 65B for fixing the lower portion of the transaxle mount bracket 39. As indicated by an arrow 99A in FIG. 6, the lower portion of the transaxle mount bracket 38 is bolted to the pedestal 66A. As indicated by arrow 99B in FIG. 6, the transaxle mount bracket 39 is bolted to the pedestals 64A, 66A. Here, the surface of the left side plate 52 is the inner side surface of the suspension member 50 in the vehicle width direction.

As shown in FIG. 3, the front end block 70 is a rectangular member with a closed cross-section to which the front end of the body portion 10 and the front end of the suspension member 50 are connected. As shown in FIG. 2, the right end of front end block 70 is connected to the left end of rear pillar 84. Also, the suspension member 50 is connected to the lower half portion 72 of the front end block 70. Further, as shown in FIG. 6, the left side plate 52 of the suspension member 50 and the front end block 70 are connected by ribs 73 and 74. Therefore, the suspension member 50 is connected to the rear pillar 84 and the rocker 81 via the front end block 70. A receiving seat 75 to which the front end of a connection member 76 is connected is provided on the upper portion of the front end block 70. The receiving seat 75 protrudes obliquely upward from the upper end of the front end block 70 to the rear of the vehicle.

Figure 5:
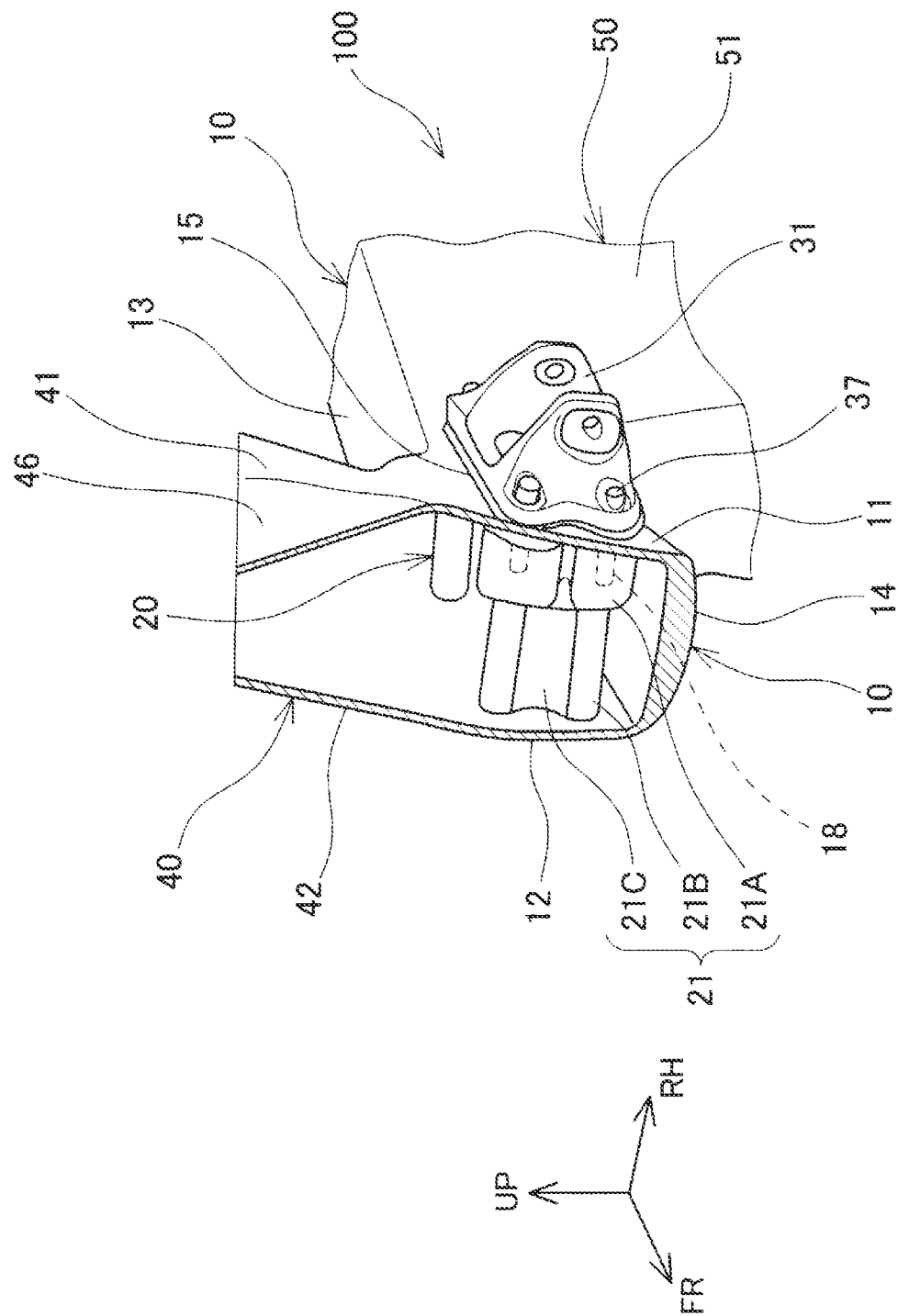
FIG. 5 is a cross-sectional perspective view of the rear component showing section V-V shown in FIG. 3.

Next, the internal structures of the body portion 10 and the suspension member 50 will be described with reference to FIGS. 4A, 4B, and 5. FIGS. 4A, 4B, and 5, hatching indicates a cross section. As shown in FIGS. 4A and 4B, first connecting members 20 to 23 and a second connecting member 25 are provided inside the body portion 10. The first connecting member 20 on the frontmost side connects the right side plate 11 and the left side plate 12 in the vehicle width direction at a position where the bolt hole 16 in front of the base 15 is provided. The second first connecting member 21 from the front connects the right side plate 11 and the left side plate 12 in the vehicle width direction at a position where the bolt hole 16 is provided behind the base 15. The third first connecting member 22 from the front connects the right side plate 11 and the left side plate 12 in the vehicle width direction at a position where the bolt hole 18 is provided in front of the base 17. The fourth first connecting member 23 from the front connects the right side plate 11 and the left side plate 12 in the vehicle width direction at a position where the bolt hole 18 is provided behind the base 17. The second connecting member 25 is configured integrally with the third first connecting member 22 from the front. The second connecting member 25 connects the right side plate 11 and the left side plate 12 in the vehicle width direction at a position where the bolt hole 65A of the pedestal 64A provided on the left side plate 12 is provided.

Here, the configuration of the second first connecting member 21 from the front will be described with reference to FIG. 5. As shown in FIG. 5, the first connecting member 21 includes two upper and lower large diameter portions 21A that connect to the right side plate 11, and two upper and lower small diameter portions 21B that connect the left end of each large diameter portion 21A to the inner surface of the left side plate 12, and ribs 21C that vertically connect the upper and lower large diameter portions 21A and the upper and lower small-diameter portions 21B. A bolt hole 18 into which a bolt 37 for fixing the arm bracket 31 to the base 15 is screwed is provided inside the large diameter portion 21A. Thus, the first connecting member 21 connects the right side plate 11 and the left side plate 12 in the vehicle width direction at the position where the arm bracket 31 is provided. The frontmost first connecting member 20 and the fourth first connecting member 23 from the front have the same structure as the second first connecting member 21 from the front.

As shown in FIG. 4B showing details of the IVB portion, the third first connecting member 22 from the front has the same configuration as the second first connecting member 21 from the front, and is attached to the left side plate 12 of the small diameter portion 22B. The left large diameter portion 25A has a larger diameter at the portion connected to the. A bolt hole 65A into which a bolt (not shown) for fixing the upper portion of the transaxle mount bracket 38 is screwed is provided inside the left large diameter portion 25A. Therefore, the left large diameter portion 25A and the third first connecting member 21 from the front are integrally arranged at the position where the transaxle mount bracket 38 is provided, and the right side plate 11 and the left side plate 12 are arranged in the vehicle width direction. A second connecting member 25 to be connected is configured.

As shown in FIG. 6, inside the suspension member 50, a second bolt connecting the right side plate 51 and the left side plate 52 in the vehicle width direction is provided at a position where a bolt hole 67A of a pedestal 66A provided on the left side plate 52 is provided. A second connecting member 26 is provided. A second connecting member 27 that connects the right side plate 51 and the left side plate 52 in the vehicle width direction is provided at a position where the bolt holes 65B and 67B of the pedestals 64B and 66B provided on the left side plate 52 are provided. The second connecting members 26 and 27 connect the right side plate 51 and the left side plate 52 in the vehicle width direction at positions where the transaxle mount brackets 38 and 39 are provided.

The first connecting members 20 to 23 and the second connecting members 25 to 27 described above are integrally formed with the body portion 10, the tower portion 40, and the suspension member 50 by casting.

As described above, the rear component 100 of the embodiment is a hollow part that is integrally cast, and can reduce the weight of the vehicle 300 with a simple structure. Further, by providing the first connecting members 20 to 23, it is possible to improve the strength and rigidity of the portion where the body portion 10 and the upper arm 201 of the suspension device 200 are connected. Furthermore, by providing the second connecting members 25 to 27, it is possible to improve the strength and rigidity of the portion where the body portion 10 and the transaxle are connected and the portion where the suspension member 50 and the transaxle are connected.

In the above description, the general portion of the body portion 10 of the rear component 100 has been described as a square closed cross-sectional portion. However, the general part of the body portion 10 of the rear component 100 is not limited to this. The general portion of the body portion 10 of the rear component 100 may be, for example, an elliptical closed cross-sectional portion.

What is claimed is:

1. A vehicle rear component to be connected to a rear end of a rocker and a rear pillar and to extend rearward of a vehicle, wherein:
   the vehicle rear component is an integrally cast hollow member including a body, a tower, and a suspension member;
   the body has a closed section at least in part, extends in a vehicle front-rear direction, and connects the rear pillar and a rear member at a rear of the vehicle;
   the tower is connected to an upper side of the body and has a space for housing a part of a suspension device;
   the suspension member has a closed section at least in part, extends in the vehicle front-rear direction on a lower side of the body, and includes a front end connected to the rocker and the rear pillar;
   arm brackets for connecting arms of the suspension device are provided on vehicle width direction outer surfaces of the body and the suspension member; and
   the body includes a first connecting member that connects a vehicle width direction outer plate and a vehicle width direction inner plate in a vehicle width direction at a position where the arm bracket is provided.

2. The vehicle rear component according to claim 1, wherein the first connecting member is cast integrally with the body, the tower, and the suspension member.

3. The vehicle rear component according to claim 1, wherein:
   transaxle mount brackets for connecting a transaxle are provided on vehicle width direction inner surfaces of the body and the suspension member; and
   the body and the suspension member include second connecting members that connect the vehicle width direction outer plate and the vehicle width direction inner plate in the vehicle width direction at positions where the transaxle mount brackets are provided.

4. The vehicle rear component according to claim 3, wherein the second connecting members are cast integrally with the body, the tower, and the suspension member.

* * * * *